(12) United States Patent
Roys

(10) Patent No.: US 7,461,670 B1
(45) Date of Patent: Dec. 9, 2008

(54) CYCLE INDICATOR FOR FLUID DISTRIBUTION SYSTEMS

(76) Inventor: Curtis Roys, 3201 W. Wall St., Midland, TX (US) 79701-6759

( * ) Notice: Subject to any disclaimer, the term of this patent is extended or adjusted under 35 U.S.C. 154(b) by 427 days.

(21) Appl. No.: 11/186,461

(22) Filed: Jul. 21, 2005

Related U.S. Application Data

(60) Provisional application No. 60/590,770, filed on Jul. 23, 2004.

(51) Int. Cl.
*F16K 37/00* (2006.01)
(52) U.S. Cl. .................... 137/554; 137/556; 137/559
(58) Field of Classification Search ............. 137/553, 137/554, 556, 559; 251/65; 116/277; 92/5 R
See application file for complete search history.

(56) References Cited

U.S. PATENT DOCUMENTS

| | | | | |
|---|---|---|---|---|
| 2,446,657 A | * | 8/1948 | MacLeod et al. ............... 92/5 R |
| 2,533,491 A | * | 12/1950 | MacMahon et al. ............ 251/65 |
| 2,638,582 A | * | 5/1953 | Urso et al. .................... 137/553 |
| 3,980,040 A | * | 9/1976 | Read ........................... 116/267 |
| 4,424,716 A | * | 1/1984 | Boehringer et al. ....... 73/861.56 |
| 5,535,698 A | * | 7/1996 | Trevisan ...................... 116/277 |
| 5,602,373 A | * | 2/1997 | Sauer et al. .................. 116/267 |
| 5,609,184 A | * | 3/1997 | Apel et al. ................... 137/554 |
| 5,655,568 A | * | 8/1997 | Bhargava et al. ............. 137/557 |
| 5,835,372 A | | 11/1998 | Roys et al. |
| 6,041,815 A | * | 3/2000 | Nichols ....................... 137/556 |
| 6,748,897 B2 | * | 6/2004 | Enzaki et al. ................ 116/267 |
| 6,823,270 B1 | | 11/2004 | Roys |
| 7,059,194 B1 | * | 6/2006 | Lueck et al. ................. 137/554 |
| 2002/0017324 A1 | * | 2/2002 | Hisamura et al. ............ 137/554 |
| 2004/0003849 A1 | * | 1/2004 | Rausch et al. ............... 137/554 |

* cited by examiner

*Primary Examiner*—John Rivell
(74) *Attorney, Agent, or Firm*—Scheinberg & Griner, LLP; Michael O Scheinberg; Robert McMinn

(57) ABSTRACT

A cycle indicator is provided for monitoring movement of a fluid control piston of a divider block for a fluid distribution system. The cycle indicator connects to the divider block in a manner that allows fluid communication between the divider block and the cycle indicator. The cycle indicator includes a spring-biased piston follower that extends into the divider block through a housing so that movement of the fluid control piston is translated to the piston follower. The piston follower extends into the divider block through an opening in the housing. The opening is not sealed allowing fluid within the divider block cylinder to flow past the piston follower and into the housing. Since there is no relative movement between the seal and any moving part such as the piston follower fluid leakage is eliminated or at least substantially reduced. An internal magnet is coupled to the piston follower and activates an external magnet that provides a visual indication of the movement of the fluid control piston.

9 Claims, 3 Drawing Sheets

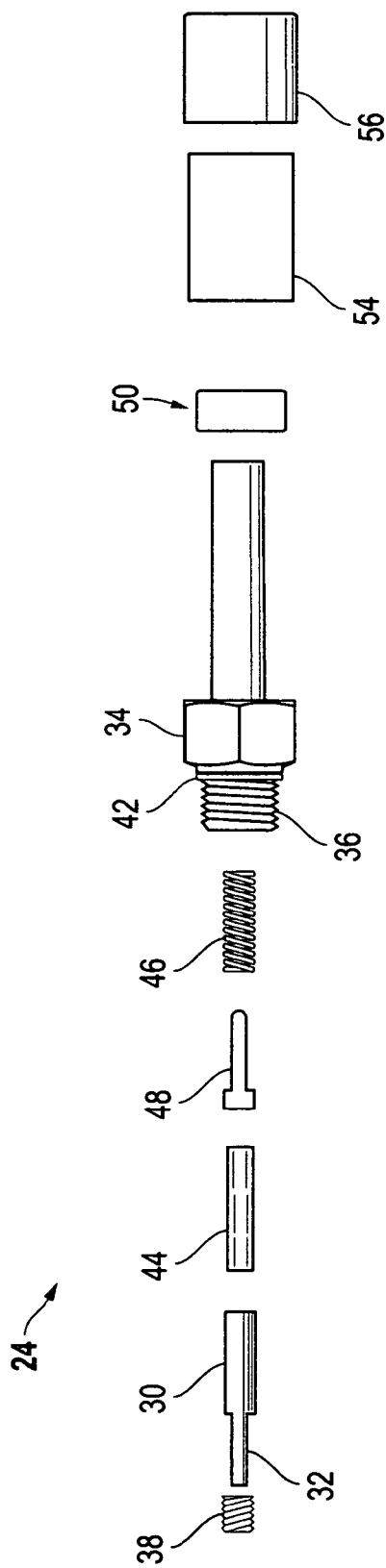
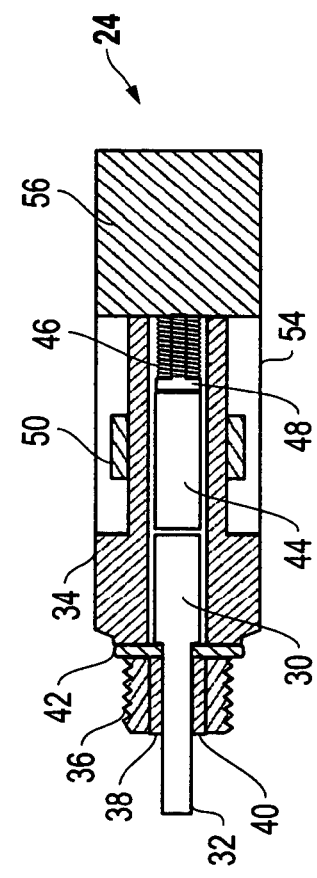

CYCLE INDICATOR FOR FLUID DISTRIBUTION SYSTEMS

This invention claims the benefit of U.S. Provisional Application No. 60/590,770 filed on Jul. 23, 2004, the entire disclosure of which is hereby incorporated by reference and set forth in its entirety for all purposes.

TECHNICAL FIELD OF THE INVENTION

The present invention relates generally to high pressure, low volume fluid systems such as systems used to distribute lubricants to compressors.

BACKGROUND OF THE INVENTION

Divider blocks are used to distribute a fluid at high pressure and low volume. Divider blocks are described, for example, in U.S. patent application Ser. No. 10/816,212, filed Apr. 1, 2004, which is hereby incorporated by reference. Because the amount of fluid that a divider block dispenses during each cycle can be calculated from the piston size and stroke, the amount of fluid dispensed by a divider block in a period of time can be determined using a cycle indicator that counts the number of cycles the divider valve completes within the time period. U.S. Pat. No. 5,835,372, issued Nov. 10, 1998, describes a device for indicating cycles of divider blocks and is hereby incorporated by reference. Such cycle indicators typically have a piston follower that extends into a cylinder of the divider block through a seal and is pushed against the piston by a spring in the indicator. As the piston moves back and forth, the piston follower moves a magnet that activates a reed switch or a Hall effect sensor to indicate a cycle of the divider block.

There are several disadvantages of prior art cycle indicators. One disadvantage is that over time, fluid tends to leak past the seal through which the piston follower extends. In a typical arrangement the piston follower extends through an O-ring seal and moves relative to it as the piston follower reciprocates. After prolonged use, fluid starts to leak past the O-ring seal. Even though only a small amount of fluid may leak past the seal continued leakage can eventually cause damage to the compressor. For example, a Number 18 divider block that dispenses 30-weight oil at room temperature dispenses about six drops of oil or about 0.018 of a cubic inch for each stroke of the piston. Continued leakage could result in the loss of as much as 50 percent or more of the piston's oil output.

Another disadvantage of prior art devices is the piston follower reduces the total volume in the cylinder so the dispensing valve dispenses less fluid from the cylinder. This decreased volume of fluid dispensed can mean insufficient lubrication for the lubricated device.

Another disadvantaged of most prior art cycle indicators is that they only indicate that a cycle has occurred, but not how far the piston has moved. It is important for the operator to be able determine movement of the piston because such movement indicates whether or not the correct quantity of oil is moved out of the piston cylinder bore. For example, a short piston cycle indicates that not enough oil is being supplied to the lubricated point, which may cause premature wear or failure of the component.

Some attempts have been made to overcome the above-described problems. One such attempt includes a cycle indicator that utilizes a snap-action design with colored tape that disappears to indicate a cycle. In use, as the cylinder piston approaches the end of the cylinder a magnet causes an indicator to snap into place. Such cycle indicators are completely sealed in that the cycle indicator housing is sealed to the divider block and the fluid is allowed to bypass the piston follower, thus, eliminating fluid leakage. However, such a design does not work for all types of divider blocks and has been subject to failures in use. This design indicates only that a cycle has occurred, and does not provide an indication of actual piston stroke.

Another prior art uses balls in a transparent housing surrounding the piston follower. A magnet causes the balls to track the movement of an internal magnet. The balls, however, tend to get stuck in their races.

Industry still has a need for a reliable cycle indicator that can provide information about actual piston travel.

SUMMARY OF THE INVENTION

It is an object of the invention to provide a method and apparatus for providing a visual indication of piston travel in a high pressure, low volume fluid distribution systems.

The present invention utilizes a cycle indicator that includes a housing within which a piston follower reciprocates. The housing is adapted to be connected to a divider block of a fluid distribution system so that the piston follower extends from the housing into a cylinder of the divider block within which the piston reciprocates. The piston follower is biased to engage one end of the piston so that movement of the piston is translated to the piston follower. A first magnet is coupled to the piston follower and activates a second magnet that provides a visual indication of the movement of the piston.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed might be readily utilized as a basis for modifying or designing other structures for carrying out the same purposes as the present invention. It should also be realized by those skilled in the art that such equivalent constructions do not depart from the spirit and scope of the invention as set forth in the appended claims.

BRIEF DESCRIPTION OF THE DRAWINGS

For a more through understanding of the present invention, and advantages thereof, reference is now made to the following descriptions taken in conjunction with the accompanying drawings, in which:

FIG. 3 is an exploded view of the cycle indicator of the present invention.

FIG. 4 is a sectional view of the assembled cycle indicator of FIG. 3 shown assembled.

DETAILED DESCRIPTION OF PREFERRED EMBODIMENTS

In a preferred embodiment, the cycle indicator housing is connected to the divider block in a sealed arrangement. The piston follower reciprocates within the housing and extends into the divider block through an opening in the housing. The opening is not sealed allowing fluid within the divider block cylinder to flow past the piston follower and into the housing. The housing is sealed from the environment and communicates only with the divider block cylinder through the opening through which the piston follower extends. Since the seal is between two parts fixed in relation to each other, there is no relative movement between the seal and any moving part such as the piston follower fluid leakage is eliminated or at least substantially reduced.

Additionally, the preferred embodiment provides that the presence of the piston follower within the divider block cylinder has little or no effect on the volume of the cylinder. The size of the piston follower does not decrease the amount of fluid that is dispensed by the divider block because the volume of fluid displaced by the piston follower is the same throughout the cycle. This allows for use of a thicker or sturdier piston follower.

The stroke of the piston is accurately indicated by use of magnets. A first magnet is located within the housing and engages one end of the piston follower. Movement of the piston along its stroke causes the piston follower to reciprocate, which in turn, translates the piston movement to the first magnet. A second magnet is located externally of the housing and is coupled to the housing to move in sympathy with the first magnet. The housing includes a clear window enclosing the second magnet and through which movement of the second magnet can be seen to give a visual indication of piston movement.

Fluid distribution systems for industrial machine applications typically supply pressurized oil to selected areas through one or more fluid supply lines. Some fluid distribution systems utilize assemblies that are known as "divider blocks" or "divider valves" that divide a volume of lubrication fluid into multiple output lines directed to the selected areas to be lubricated. The divider block may contain multiple divider block sections with each divider block section supplying fluid to one of the selected areas to be lubricated. Each divider block section typically includes a piston that reciprocates within a cylinder bore to cooperate with one or more fluid ports to supply a selected amount of fluid to an associated output line. It is important to monitor the operation of the piston in order to ensure that the correct amount of lubrication fluid is being supplied to the areas to be lubricated. Cycle indicator devices are typically used in order to monitor operation of the divider block piston.

Figure 1:
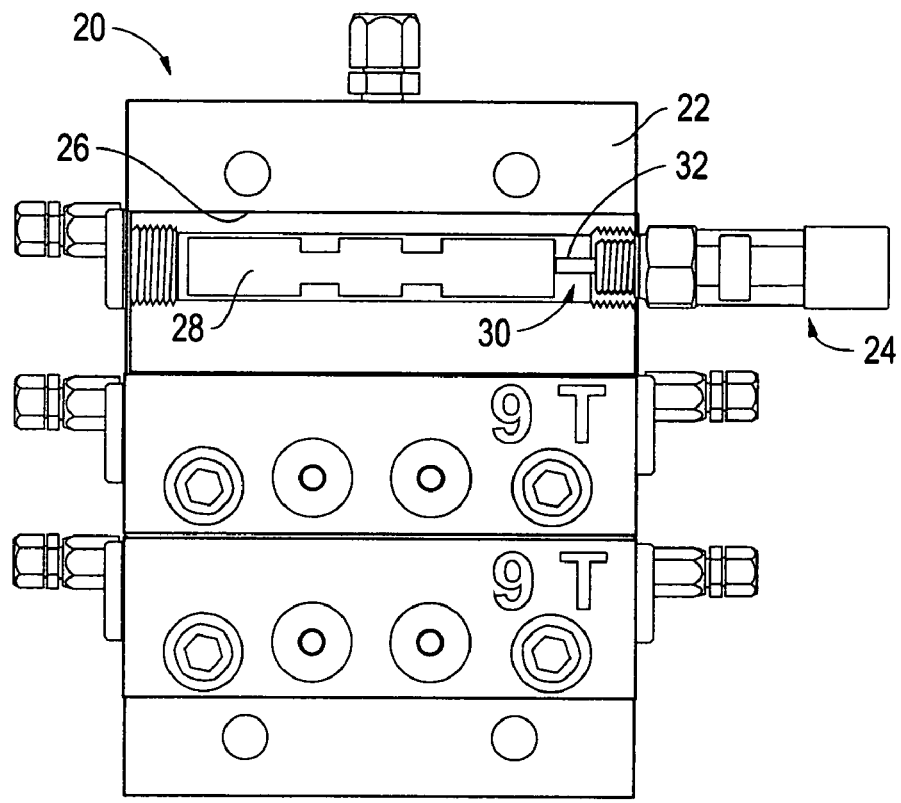
FIG. 1 is a view showing the cycle indicator of the present invention assembled with a divider block fluid distribution system.

FIG. 1 is a simplified view of a known type of divider block 20 with multiple divider block sections 22 shown with a cycle indicator device 24 of the present invention associated with one of the divider block sections 22. Divider block section 22 includes a cylinder bore 26 within which a piston 28 reciprocates to act in concert with one or more fluid supply and exhaust ports (not shown) to distribute a known amount of fluid to an output line (not shown). Cycle indicator 24 is threaded into one end of divider block section 22 and includes a piston follower 30 having a reduced-diameter end 32 that extends into cylinder bore 26 to engage an end of the piston 28. As can be readily understood, reciprocation of piston 28 is transferred to piston follower 30, which then translates the piston movement to an indicator that is visible to an operator as will be described below.

Figure 2:
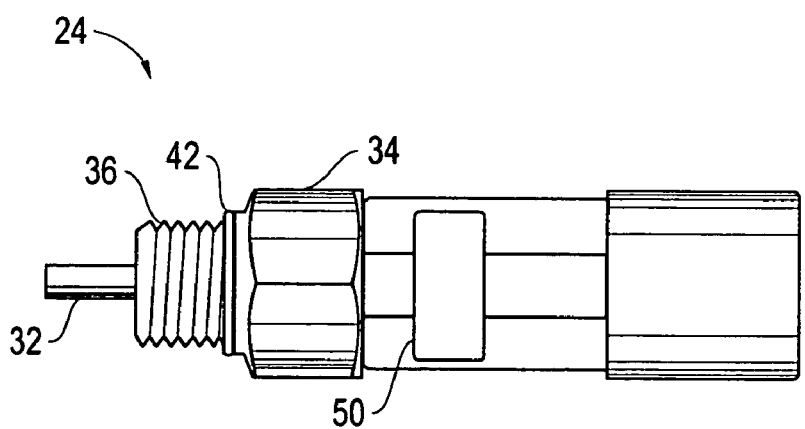
FIG. 2 is an enlarged view of the cycle indicator of the present invention.

Referring now to FIGS. 2-4, cycle indicator 24 represents a preferred embodiment of the present invention capable of use with existing fluid distribution systems. Cycle indicator 24 includes a housing 34, preferably stainless steel, with external male threads 36 at one end that are threaded into a female threaded end in the divider block section 22 so that reduced-diameter end 32 of piston follower 30 extends into cylinder bore 26 to engage piston 28. The threaded end of the housing 34 is preferably closed with any type of plug such as a hex lock screw 38, as described in U.S. Pat. No. 6,823,270 to Roys for a "Fluid Flow Monitoring System." Hex lock screw 38 includes an opening 40 through which reduced-diameter end 32 of piston follower 30 extends so that cylinder bore 26 communicates with the interior of housing 34 through opening 40 when cycle indicator 24 is connected to the divider block section 22. An O-ring 42 located externally of housing 34 provides a seal between the cycle indicator 24 and divider block section 22. O-ring 42 provides a reliable seal because it is located between stationary elements. However, there is no seal between reciprocating piston follower 30 and housing 34. In this manner, fluid can flow past piston follower 30 back and forth between housing 34 and cylinder bore 26. However, the fluid has no opportunity to leak from either housing 34 or divider block section 22. Additionally, communication between cylinder bore 26 and housing 34 provides that the volume of fluid displaced by piston follower 30 is the same throughout the cycle. Therefore, the volume of the cylinder bore 26 is not diminished by the presence of piston follower 30.

Piston follower 30 is enclosed and reciprocates within housing 34 and drives an internal magnet 44 both of which are biased by a spring 46 through a spacer 48. Spring 46 ensures that piston follower 30 will follow piston 28 over the total length of its travel and accurately reflect the travel of piston 28. Both spacer 48 and piston follower 30 are preferably non-magnetic and are preferably stainless steel. Internal magnet 44 is magnetically coupled to an external magnet 50 that serves as a visible indicator of movement of piston 28. Preferably, both internal magnet 44 and external magnet 50 are made of neodymium. External magnet 50 is preferably annular (FIG. 5) and includes a central opening 52 configured to slidably fit over the outside of the housing 34. the term "annular" is used to mean that the shape has a hole in the middle and not limited to any particular cross section, that is, the cross section could be round, rectangular, or other shape. External magnet 50 is visible through a clear window 54, preferably a UV stabilized polycarbonate, held between housing 34 and an end piece 56. End piece 56 is held onto by housing 34 by any preferred method such as by a screw (not shown) into the end of housing 34, the screw not penetrating into the cavity inside the housing. Clear window 54 provides protection against environmental contamination but allowing clear observation of external magnet 50. Preferably, external magnet 50 is brightly colored or is covered with a brightly colored material to make observation easy from a distance.

Figure 5:
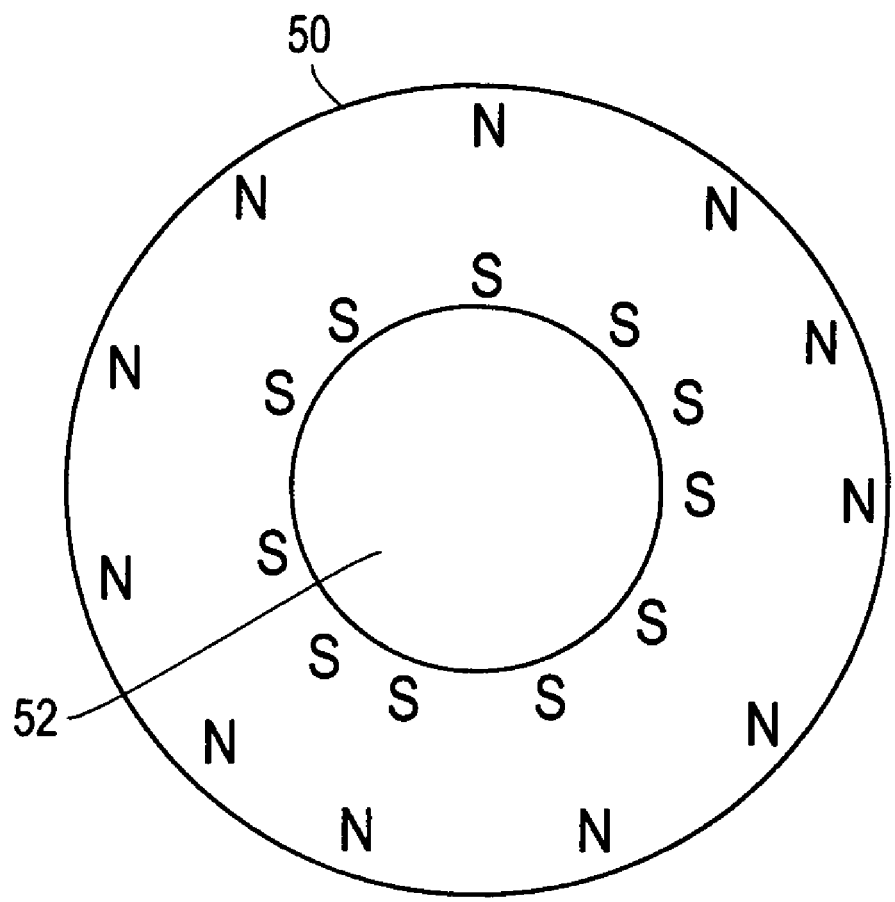
FIG. 5 is an end view of a preferred polarization orientation of the external magnet.

External magnet 50 is preferably polarized as seen in FIG. 5 to enhance the coupling with internal magnet 44 and to ensure an accurate indication of movement of piston 22. Both internal magnet 44 and external magnet 50 are polarized with the poles oriented radially. The polarization of external magnet 50 is seen in FIG. 5 in which one pole is configured around central opening 52 and the opposite pole is configured around the outer periphery of external magnet 50. Internal magnet 44 is oppositely polarized radially so that external magnet 50 follows internal magnet 44 as it reciprocates and the two magnets remain substantially concentric with each other. External magnet 50, internal magnet 44, or both can use the radial pole orientation. Alternatively, other flux concentrating configurations including multiple pole magnets may be used for external magnet 50, internal magnet 44, or both. Internal magnet 44 is positioned radially proximate external magnet 50 for magnetic coupling so that movement of piston 28 is transferred to external magnet 50 through piston follower 30 and internal magnet 44. The magnetic coupling is sufficiently strong so that external magnet 50 does not stick, and accurately follows internal magnet 44. External magnet 50 is preferably painted a bright color, so that an operator can observe its motion from a distance to observe the piston motion. In other embodiments, s part of all of piston follower can be magnetized in place of using a separate internal magnet 44, or internal magnet 44 can be integrated into the piston follower 30 so that they are one piece.

In use, cycle indicator 24 is threaded into divider block section 22 so that reduced-diameter end 32 of piston follower 30 extends into cylinder bore 26 to engage one end of piston 26. On assembly, the piston follower be "preloaded" against the piston, that is, the piston follower should extend sufficiently far into cylinder bore 26 that the spring 40 presses the piston follower against the piston 28 when the piston 28 is at its furthest position from housing 34. Piston 28 reciprocates to cycle fluid through cylinder bore 26. Movement of piston 28 causes piston follower 30 to move against spring 40. Piston follower 30 drives internal magnet 44, which in turn, drives external magnet 50 so that movement of piston 28 is translated to external magnet 50. An operator can determine that divider block section 22 is operating effectively by viewing movement of external magnet 50 through window 54. In order to determine proper operation it is important for an operator to be aware of actual movement of piston 28. For example, reciprocation of external magnet 50 along a short stroke indicates that piston 28 is short stroking, which may mean that not enough oil is being injected to the supply lines or that the divider block is blocked. In another example, if the divider block system is unbalanced with excessive pressure on one side of the divider block, external magnet 50 will simply "pop" back and forth in a snap motion indicating a balance problem. In still another example, sudden short strokes of external magnet 50 may indicate that the divider block has been over-tightened, which may cause premature wear of the divider block piston due to distortion of the cylinder bore. Therefore, external magnet 50 provides a visual indicator of movement of the divider block piston, so that an operator can determine whether or not the fluid distribution system is operating properly.

An advantage of some embodiments is to provide a cycle indicator that is adapted for use with existing fluid distribution systems.

Yet another advantage of some embodiments of the invention is to provide a cycle indicator for fluid distribution systems that overcomes fluid leakage problems associated with current devices.

Still another advantage of some embodiments of the invention is to provide a cycle indicator for fluid distribution systems that overcomes fluid displacement and reduced cylinder volume associated with some current devices.

Another advantage of some embodiments of the invention is to provide a cycle indicator for fluid distribution systems that provides an accurate indication of the fluid distribution system piston travel so that it can be determined that the piston traverses its full design stroke.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A cycle indicator for use with a divider block in a high pressure, low volume lubricant distribution system, the divider block having a piston bore and a reciprocating piston, the reciprocating piston dispensing a quantity of lubricant during each reciprocation cycle, the cycle indicator comprising:
    a housing having an internal cavity, the cavity communicating to the piston bore of the divider block;
    a piston follower contacting the piston within the piston bore and extending into the cavity;
    a spring biasing the piston follower against the reciprocating piston so that the piston follower follows the motion of the piston as it reciprocates and dispenses lubricant;
    an internal magnet within the cavity and following the motion of the piston follower; and
    an external annular indicator following the motion of the internal magnet, which follows the motion of the piston follower, which follows the motion of the piston, the external indicator providing a visual indication of the piston motion, in which the external indicator is an external magnet and in which the external magnet includes radially oriented magnetic poles.

2. The cycle indicator of claim 1 in which the internal magnet includes radially oriented magnetic poles, the poles oriented opposite to those of the external magnet, so that the external magnet is attracted to and follows the motion of the internal magnet.

3. The cycle indication of claim 2 in which the internal and external magnets are concentric.

4. A fluid cycle indicator for use with a divider block of a fluid distribution system comprising:
    a housing adapted for connection to a divider block having a cylinder bore with a piston that reciprocates within the cylinder bore to cycle fluid therethrough;
    a piston follower disposed within the housing having one end that extends from the housing into the cylinder bore for driving engagement with the piston, so that movement of the piston is translated to the piston follower;
    a spring biasing the piston follower against the reciprocating piston so that the piston follower follows the motion of the piston as it reciprocates and dispenses fluid;
    an external magnet positioned outside the housing and coupled to the piston follower motion to provide a visual indicator corresponding to the piston movement;
    an internal magnet located within the housing to be in driving engagement with the piston follower, the external magnet coupled to the internal magnet, so that movement of the piston is transferred to the external magnet through the piston follower and the internal magnet; and
    in which at least one of the internal magnet and the external magnet include radially oriented magnetic poles.

5. The cycle indicator of claim 4, wherein the external magnet has radial magnetic poles and the internal magnet has radial magnetic poles oriented opposite that of the internal magnet, the external magnet being located concentric to the internal magnet for magnetic coupling, so that movement of the internal magnet is translated to the external magnet.

6. A method of determining proper operation of a fluid distribution system that includes a divider block having cylinder bore with a piston that reciprocates within the cylinder bore to cycle fluid therethrough, the method comprising:

providing multiple pistons in multiple piston bores, the piston bores connected by a series of passages such that the multiple pistons reciprocate under the pressure of an incoming lubricant, each piston dispensing a fixed amount of lubricant;

providing a housing and a piston follower, the piston follower preloaded against one of the pistons by a spring;

connecting the housing to the divider block so that one end of the piston follower extends from the housing into the cylinder bore for driving engagement with the piston, so that movement of the piston as it dispenses fluid is translated to the piston follower;

providing an external magnet to be operated through the piston follower to provide a visual signal of movement of the piston;

providing an internal magnet associated with the piston follower so that movement of the piston is transferred to the internal magnet through the piston follower and then to the external magnet; and providing that at least one of the internal magnet and the external magnet include radially oriented magnetic poles.

7. The method of claim 6, further providing that the external magnet has radially oriented magnetic poles and the internal magnet has radially oriented magnetic poles oriented opposite those of the external magnet, the external magnet being concentric with the internal magnet for magnetic coupling, so that movement of the internal magnet is translated to the external magnet.

8. The method of claim 6, further arranging the external magnet to reciprocate along an outer surface of the housing between a first end and a second end of the housing, the housing further including a clear window through which the external magnet is visible.

9. A low volume, high pressure lubricant distribution system, comprising:

multiple piston bores;

a piston positioned in each of the multiple piston bores;

passages interconnecting the multiple pistons bores;

an inlet for providing high pressure fluid to the piston bores, the passages arranged such that the multiple pistons are caused to reciprocate in the corresponding piston bores by the incoming lubricant, each piston dispensing lubricant as it reciprocates;

a housing having an internal cavity, the cavity communicating to at least one of the piston bores;

a spring for biasing the piston follower against the reciprocating piston so that the piston follower follows the motion of the piston as it reciprocates and dispenses lubricant;

an internal magnet positioned within the cavity and following the motion of the piston follower; and an external indicator following the motion of the internal magnet, which follows the motion of the piston follower, which follows the motion of the piston, the external indicator providing a visual indication of the piston motion, the external indicator including an annular magnet having a radially oriented magnetic poles and the internal magnet including radially oriented magnetic poles, the magnetic poles of the internal magnet being oriented opposite to the magnetic poles of the annular magnet.

\* \* \* \* \*